(12) United States Patent
Suematsu (10) Patent No.: US 9,077,003 B2
(45) Date of Patent: Jul. 7, 2015

(54) FUEL CELL SYSTEM

(75) Inventor: Keigo Suematsu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 954 days.

(21) Appl. No.: 12/810,106

(22) PCT Filed: Jan. 23, 2009

(86) PCT No.: PCT/JP2009/051108
§ 371 (c)(1),
(2), (4) Date: Jun. 22, 2010

(87) PCT Pub. No.: WO2009/096339
PCT Pub. Date: Aug. 6, 2009

(65) Prior Publication Data
US 2011/0104580 A1    May 5, 2011

(30) Foreign Application Priority Data
Jan. 30, 2008   (JP) .................. 2008-019409

(51) Int. Cl.
*H01M 8/04* (2006.01)
(52) U.S. Cl.
CPC ...... *H01M 8/04141* (2013.01); *H01M 8/04097* (2013.01); *H01M 8/04179* (2013.01);
(Continued)

(58) Field of Classification Search
CPC .......... H01M 2250/20; H01M 8/0202; H01M 8/0206; H01M 8/0228; H01M 8/0247; H01M 8/0254; H01M 8/0258; H01M 8/0267; H01M 8/0276; H01M 8/04074; H01M 8/04097; H01M 8/04126; H01M 8/04231; H01M 8/0625; H01M 8/2415; G01R 19/08; G01R 31/3606
See application file for complete search history.

(56) References Cited

U.S. PATENT DOCUMENTS

| 6,777,126 | B1 * | 8/2004 | Allen ........................... 429/434 |
| 2002/0192520 | A1 * | 12/2002 | Nonobe ........................ 429/23 |

(Continued)

FOREIGN PATENT DOCUMENTS

| JP | 9 259913 | 10/1997 |
| JP | 2002 367655 | 12/2002 |

(Continued)

OTHER PUBLICATIONS

International Preliminary Report on Patentability and Written Opinion issued Aug. 31, 2010, in PCT/JP2009/051108, filed Jan. 23, 2009.

(Continued)

*Primary Examiner* — Carlos Barcena
(74) *Attorney, Agent, or Firm* — Oblon, McClelland, Maier & Neustadt, L.L.P.

(57) ABSTRACT

The present invention relates to a fuel cell system that is capable of running a detailed diagnostic check on the internal dryness of a fuel cell. The fuel cell system measures the distribution of electrical current density on a power generation plane of the fuel cell, and diagnoses the internal dryness of the fuel cell in accordance with changes in the peak position of electrical current density on the power generation plane. If the fuel cell is configured to let a reactant gas (hydrogen) on the anode side and a reactant gas (air) on the cathode side flow in opposing directions with the power generation plane positioned in between, the fuel cell system judges whether the peak position of electrical current density is displaced toward the outlet of an anode or the outlet of a cathode. In accordance with the result of judgment, the fuel cell system can determine whether dry-up has occurred on the anode side or cathode side.

6 Claims, 7 Drawing Sheets

(52) U.S. Cl.
CPC ...... *H01M 8/04268* (2013.01); *H01M 8/04492* (2013.01); *H01M 8/04529* (2013.01); *H01M 8/04574* (2013.01); H01M 8/04582 (2013.01); *H01M 8/04589* (2013.01); *H01M 8/04828* (2013.01); *H01M 8/0485* (2013.01); *Y02E 60/50* (2013.01)

(56) References Cited

U.S. PATENT DOCUMENTS

| | | | |
|---|---|---|---|
| 2004/0095127 A1 | 5/2004 | Mohri et al. | |
| 2005/0053814 A1 | 3/2005 | Imamura et al. | |
| 2006/0263654 A1* | 11/2006 | Goebel et al. | 429/13 |

FOREIGN PATENT DOCUMENTS

| | | |
|---|---|---|
| JP | 2005 100952 | 4/2005 |
| JP | 2005 123162 | 5/2005 |
| JP | 2005 310510 | 11/2005 |
| JP | 2006 59748 | 3/2006 |
| JP | 2006 318784 | 11/2006 |
| WO | WO 2008/017943 A2 | 2/2008 |

OTHER PUBLICATIONS

German Office Action issued Jul. 4, 2012 in Patent Application No. 112009 000 469.5.

* cited by examiner

S100: The peak position of electrical current density is displaced toward the CA outlet.

S104: The peak position of electrical current density is displaced toward the AN outlet.

S108: The electrical current density near the CA outlet is decreased..

S112: The electrical current density near the AN outlet is decreased..

S200: The peak position of electrical current density is displaced toward the outlet.

S204: The peak position of electrical current density is displaced toward the inlet.

S210: The electrical current density near the outlet is decreased..

S214: The electrical current density near the outlet is recovered..

FUEL CELL SYSTEM

TECHNICAL FIELD

The present invention relates to a fuel cell system, and more particularly to a fuel cell system that runs a diagnostic check on the internal dryness of a fuel cell and reflects the diagnostic check result in system control.

BACKGROUND ART

Previously proposed technologies disclosed, for instance, in JP-A-2006-318784, JP-A-2005-100952, and JP-A-9-259913 use a plurality of current sensors installed in a plane parallel to that of power generation by a fuel cell, and reflect the results of partial current measurements taken by the current sensors in system control. The technologies disclosed in such patent documents individually compare partial currents measured at various measurement points against a predetermined reference value or compare a current distribution pattern obtained by consolidating the measured values against a predetermined reference pattern, and examine the results of comparison to detect an abnormality such as dry-up, flooding, fuel gas deficiency, or oxidant gas deficiency.

The term "dry-up" denotes a phenomenon in which the fuel cell has a low internal water content, thereby allowing an electrolytic film to dry. The electrolytic film of the fuel cell requires water molecules to move internal hydrogen ions, and exhibits high ionic conductivity only when it contains water. Therefore, if the electrolytic film is dry due to the low water content of the fuel cell, the ionic conductivity decreases to significantly degrade the power generation performance of the fuel cell. To maintain the excellent power generation performance of the fuel cell, it is therefore important that the interior of the fuel cell be kept in an appropriate wet state.

A previously disclosed technology (hereinafter referred to as the prior art) described in JP-A-2006-318784 relates to the detection of dry-up (also referred to as dry-out). The prior art compares the distribution of electrical current density in an inlet flow path of cathode gas (oxidant gas) against the distribution of electrical current density in an outlet flow path. If the electrical current density in the inlet flow path is decreased, the prior art concludes that a dry-up phenomenon has occurred.

DISCLOSURE OF THE INVENTION

Problem to be Solved by the Invention

The above-described prior art can detect the occurrence of a dry-up phenomenon on the inlet side of a cathode. However, the prior art cannot run a diagnostic check to determine the portion of a power generation plane that is affected by dry-up. Further, the prior art detects only a dry-up phenomenon that occurs on the inlet side of the cathode. However, a dry-up phenomenon occurs on the anode side as well. Dry-up can be avoided by changing fuel cell operating conditions. To avoid a dry-up phenomenon, however, it is important that the conditions where dry-up occurs be determined in detail to select an appropriate control method depending on the determined conditions.

The present invention has been made in view of the above circumstances. It is an object of the present invention to provide a fuel cell system that is capable of running a detailed diagnostic check on the internal dryness of a fuel cell.

Means for Solving the Problem

In accomplishing the above object, according to a first aspect of the present invention, there is provided a fuel cell system including a fuel cell, measurement means, and diagnostic check means. The fuel cell generates electrical power after allowing an anode and a cathode to respectively receive a reactant gas. The measurement means measures the distribution of electrical current density on a power generation plane of the fuel cell. The diagnostic check means diagnoses the internal dryness of the fuel cell in accordance with changes in the peak position of electrical current density on the power generation plane.

The measurement means may measure the distribution of electrical current density either by measuring partial currents at a plurality of places on a power generation plane or by measuring the electrical current densities of individual regions into which the power generation plane is divided (the electrical current density of a region is obtained by dividing a representative electrical current value by the area of the region).

The peak position of electrical current density can be determined by locating a position that exhibits the highest value within the distribution of electrical current density on the power generation plane. For example, the peak position may be a position at which the highest electrical current density (or the highest partial current value) is measured by one of a plurality of sensors or a position at which a curve (electrical current density curve) obtained by fitting individual sensor values reaches its peak.

When the amount of a change in the peak position corresponds to the range of dry-up to be detected, it can be concluded that the peak position is changed. A reference change amount can be predetermined by performing an experiment or the like in accordance with the range of dry-up to be detected. For example, when the highest partial current value, which is measured by a certain sensor, is updated by another sensor or when the peak position of the curve is moved over a distance longer than predetermined through an experiment or the like, it can be concluded that the peak position is changed. In the former case, for example, it can be concluded that the peak position is changed when the highest partial current value, which is measured by a certain sensor, is updated by a neighboring sensor or only when the highest partial current value, which is measured by a certain sensor, is updated by a sensor positioned more than a predetermined distance from the former sensor.

A diagnosis based on a change in the peak position is a diagnosis made in accordance with the amount, rate, or direction of peak position change or a combination of these. For example, the location of a dry portion can be diagnosed from the direction of peak position change, whereas the progress of drying can be diagnosed from the amount or rate of peak position change. However, the relationship between the direction of peak position change and the location of a dry portion depends on the relationship between the direction of reactant gas flow on the anode side and the direction of reactant gas flow on the cathode side.

According to a second aspect of the present invention, there is provided the fuel cell system as described in the first aspect. The fuel cell is configured to let the reactant gas on the anode side and the reactant gas on the cathode side flow in opposing directions with the power generation plane positioned in between. The diagnostic check means judges whether the peak position of electrical current density is displaced toward the outlet of the anode or the outlet of the cathode, and locates a dry portion in accordance with the result of judgment.

Whether the peak position is displaced toward the outlet of the anode or the outlet of the cathode can be determined by judging whether a sensor that has updated the highest partial current value measured by another sensor is positioned toward the outlet of the anode or the outlet of the cathode. Alternatively, it can also be determined by judging whether the peak position of the curve obtained by fitting the individual sensor values is displaced toward the outlet of the anode or the outlet of the cathode. Another alternative is to predefine a threshold value indicating the amount of peak position change in each direction and conclude that the peak position is displaced in a particular direction only when the threshold value is exceeded by the amount of peak position change in that direction.

The relationship between the direction of peak position change and the location of a dry portion can be predefined through an experiment or the like. When, for instance, the peak position of electrical current density is displaced toward the outlet of the cathode, the predefined relationship can be used to diagnose that a dry portion is positioned toward the inlet of the cathode. When, on the contrary, the peak position of electrical current density is displaced toward the outlet of the anode, the predefined relationship can be used to diagnose that a dry portion is positioned toward the inlet of the anode.

According to a third aspect of the present invention, there is provided the fuel cell system as described in the first aspect. The fuel cell is configured to let the reactant gas on the anode side and the reactant gas on the cathode side flow in parallel directions with the power generation plane positioned in between. When the peak position of electrical current density is changed, the diagnostic check means verifies whether the peak position of electrical current density varies with anode side reactant gas supply conditions, and locates a dry portion in accordance with the result of verification.

Here, when the peak position is changed, it means, for instance, that the highest partial current value, which is measured by a certain sensor, is updated by another sensor or that the peak position of the curve obtained by fitting the individual sensor values is displaced. An alternative is to predefine a threshold value for the amount of peak position change and conclude that the peak position is changed only when the threshold value is exceeded by the amount of peak position change.

The anode side reactant gas supply conditions can be defined, for instance, by an anode gas supply pressure, an anode gas supply flow rate, or a combination of both. The fact that the peak position changes in accordance with a change in the anode side reactant gas supply conditions can be verified, for instance, by confirming that the peak position changes if the anode side reactant gas supply conditions are changed and remains unchanged if the anode side reactant gas supply conditions are not changed or does not significantly change as compared to a case where the anode side reactant gas supply conditions are changed. Alternatively, the fact that the peak position of electrical current density has changed in accordance with a change in the anode side reactant gas supply conditions may be verified by checking whether the threshold value is exceeded by the amount of peak position change caused by a change in the anode side reactant gas supply conditions.

The relationship between a peak position change caused by a change in the anode side reactant gas supply conditions and the location of a dry portion can be predefined through an experiment or the like. When the peak position of electrical current density changes in accordance with a change in the anode side reactant gas supply conditions, the predefined relationship can be used to diagnose that a dry portion is positioned toward the inlet of the anode. When, on the contrary, the peak position of electrical current density remains unchanged, it can be diagnosed that a dry portion is positioned toward the inlet of the cathode.

According to a fourth aspect of the present invention, there is provided the fuel cell system as described in any one of the first to third aspects, further including control means which, when the diagnostic check means judges that the interior of the fuel cell is dry, controls operating conditions for the fuel cell in accordance with the result of judgment to ensure that the peak position of electrical current density returns to a peak position prevailing before a change.

The interior of the fuel cell includes the power generation plane of the fuel cell and a reactant gas flow path along the power generation plane. When the interior of the fuel cell is dry, it means that at least a part of the fuel cell power generation plane or reactant gas flow path is dry.

The fuel cell operating conditions to be controlled include, for instance, a cathode stoichiometric ratio, a cathode back pressure, the degree of air humidification, a refrigerant temperature, an anode stoichiometric ratio, and an anode back pressure. One or a plurality of the fuel cell operating conditions can be controlled in accordance with the location of a dry portion. Peak position changes caused by controlling the fuel cell operating conditions can be predetermined through an experiment or the like.

Advantages of the Invention

If a part of the interior of a fuel cell is dry, the power generation performance of that part degrades. Therefore, the distribution of electrical current density on the power generation plane changes so that the peak position of electrical current density shifts toward a wet side. If a dry portion is large, the degree of a peak position change increases accordingly. As described above, the internal dryness of a fuel cell becomes evident as a change in the peak position of electrical current density. Consequently, the first aspect of the present invention makes it possible to run a detailed diagnostic check on the internal dryness of a fuel cell.

The second aspect of the present invention makes it possible to determine whether the dry portion of a counter-flow fuel cell is on the inlet side of a cathode or the inlet side of an anode.

The third aspect of the present invention makes it possible to determine whether the dry portion of a parallel-flow fuel cell is on the inlet side of a cathode or the inlet side of an anode.

The fourth aspect of the present invention restores the peak position of electrical current density to the previous one prevailing before a change by controlling fuel cell operating conditions. This makes it possible to moisten the internal dryness of a fuel cell and recover the power generation performance that is degraded by the dryness.

BEST MODE FOR CARRYING OUT THE INVENTION

First Embodiment

A first embodiment of the present invention will now be described with reference to the accompanying drawings.

Figure 1:
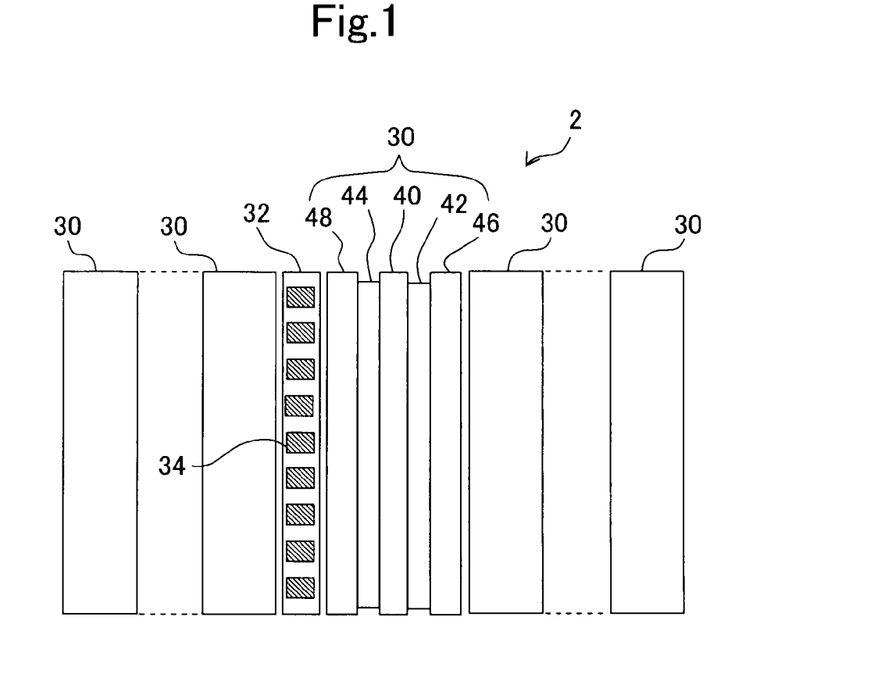
FIG. 1 is a schematic diagram illustrating the configuration of a fuel cell (fuel cell stack) according to a first embodiment of the present invention.

FIG. 1 is a schematic diagram illustrating the configuration of a fuel cell according to the first embodiment. As shown in FIG. 1, the fuel cell is used as a fuel cell stack 2, which is obtained by stacking a plurality of fuel cell units 30. Each fuel cell unit 30 includes a membrane-electrode assembly (MEA) 40 and a pair of power collector plates (cathode and anode power collector plates) 46 and 48. The membrane-electrode assembly 40 is sandwiched between the power collector plates 46 and 48. The power collector plates 46 and 48 also function as a partitioning separator between two adjacent membrane-electrode assemblies. A cathode gas flow path 42 is formed inside the cathode power collector plate 46 to supply air to the membrane-electrode assembly 40. An anode gas flow path 44 is formed inside the anode power collector plate 48 to supply hydrogen to the membrane-electrode assembly 40.

In the fuel cell stack 2, a current measurement cell 32 is stacked together with a fuel cell unit 30. A plurality of current sensors 34 are embedded in the current measurement cell 32. A current flowing out of the fuel cell unit 30 adjacent to the current measurement cell 32 or a current (partial current) flowing into the fuel cell unit 30 can be measured at a plurality of measurement points. The distribution of electrical current density on the power generation plane of the fuel cell unit (hereinafter referred to as an inspection target cell unit) 30 adjacent to the current measurement cell 32 can be measured from coordinates on the power generation plane of each current sensor 34 and a current value measured by each current sensor 34.

Figure 2:
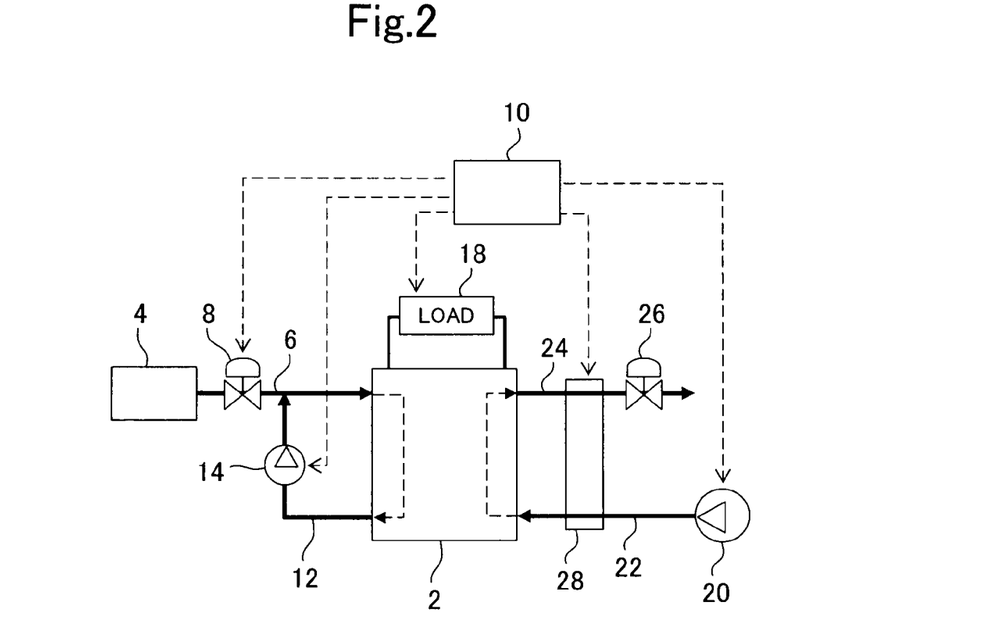
FIG. 2 is a schematic diagram illustrating the configuration of a fuel cell system with the fuel cell stack shown in FIG. 1.

FIG. 2 is a schematic diagram illustrating the configuration of a fuel cell system according to the present embodiment. The fuel cell system is a power supply system that generates electrical power by using the fuel cell stack 2 shown in FIG. 1 and supplies the generated electrical power to a motor or other electrical load 18. To permit the fuel cell stack 2 to generate electrical power, it is necessary to continuously supply an oxidant gas and a fuel gas, which are used as reactant gases. The fuel cell system according to the present embodiment uses air as the oxidant gas and hydrogen as the fuel gas.

An air supply path 22, which is used for air supply, is connected to the fuel cell stack 2. The air supply path 22 includes an air compressor 20. Air taken into the air supply path 22 by the air compressor 20 is moderately humidified by a humidifier 28, and then supplied to the fuel cell stack 2. The air supplied to the fuel cell stack 2 is distributed to the cathode of each fuel cell unit 30 through a supply manifold formed in the fuel cell stack 2. A gas (cathode off-gas) passing through the cathode of each fuel cell unit 30 is collected by an exhaust manifold formed in the fuel cell stack 2 and discharged into a cathode gas exhaust path 24. The humidifier 28 collects water from the cathode off-gas in the cathode gas exhaust path 24, and adds the collected water to the air flowing in the air supply path 22. The cathode gas exhaust path 24 includes a back pressure regulating valve 26.

A hydrogen supply path 6, which supplies hydrogen from a high-pressure hydrogen tank 4 to the fuel cell stack 2, is connected to the fuel cell stack 2. A variable pressure regulator 8 is installed in the middle of the hydrogen supply path 6. The hydrogen is supplied to the fuel cell stack 2 after its pressure is reduced to a desired level by the variable pressure regulator 8. The hydrogen supplied to the fuel cell stack 2 is distributed to the anode of each fuel cell unit 30 through a supply manifold formed in the fuel cell stack 2. A gas (anode off-gas) passing through the anode of each fuel cell unit 30 is collected by an exhaust manifold formed in the fuel cell stack 2, and discharged into an anode gas circulation path 12. The leading end of the anode gas circulation path 12 is connected downstream of the variable pressure regulator 8 in the hydrogen supply path 6. A circulation pump 14 is installed in the middle of the anode gas circulation path 12 to deliver the anode off-gas to the hydrogen supply path 6. As a means for anode gas circulation, an ejector may be used instead of the circulation pump 14.

The fuel cell system according to the present embodiment includes a controller 10. An input section of the controller 10 is connected to the current measurement cell 32. An output section of the controller 10 is connected to various devices such as the variable pressure regulator 8, circulation pump 14, load 18, air compressor 20, and humidifier 28. The operating conditions for the fuel cell stack 2 can be controlled by operating such devices. The controller 10 diagnostically checks the fuel cell stack 2 for abnormalities in accordance with a measurement signal that is input from the current measurement cell 32, and controls the operating conditions for the fuel cell stack 2 in accordance with the result of such a diagnostic check.

The method of running a diagnostic check in accordance with the measurement signal of the current measurement cell 32 and the method of controlling the operating conditions in accordance with the diagnostic check result will be described in detail below.

Figure 3:
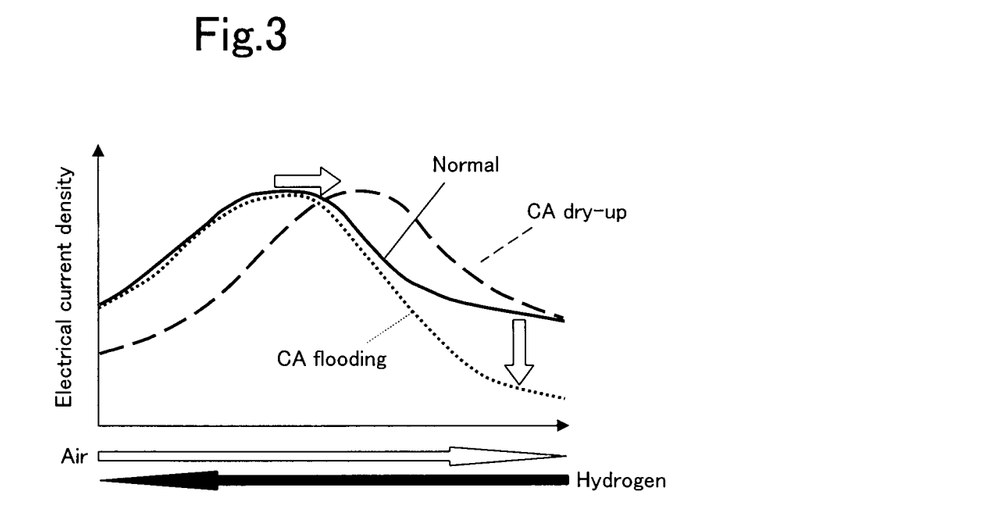
FIG. 3 is a comparison chart showing the electrical current density distribution prevailing when CA dry-up has occurred, the electrical current density distribution prevailing when CA flooding has occurred and the normal electrical current density distribution in the fuel cell configured to let the reactant gases flow in opposing directions.
Figure 4:
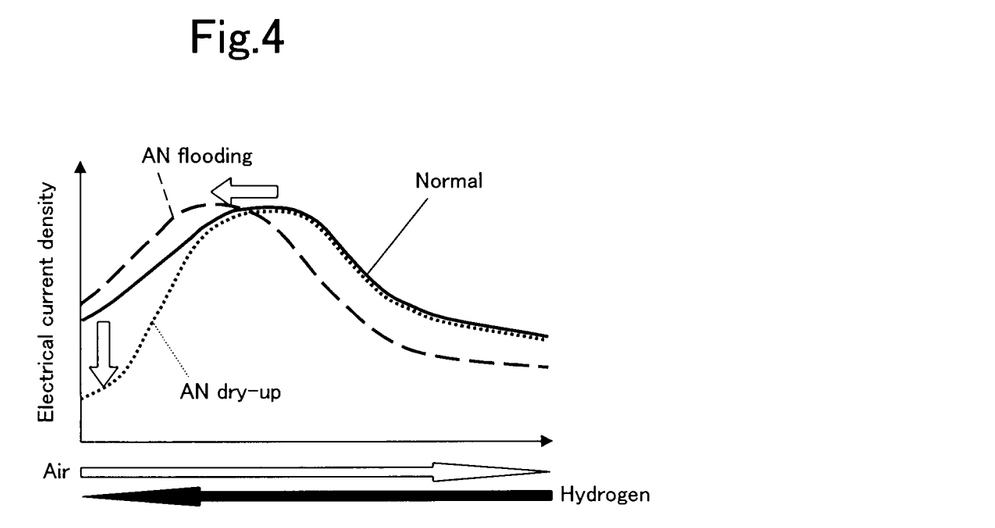
FIG. 4 is a comparison chart showing the electrical current density distribution prevailing when AN dry-up has occurred, the electrical current density distribution prevailing when AN flooding has occurred and the normal electrical current density distribution in the fuel cell configured to let the reactant gases flow in opposing directions.

FIGS. 3 and 4 show the signals of the current sensors 34 contained in the current measurement cell 32, which are arranged in the flow direction of the reactant gases. These figures indicate the distribution of electrical current density prevailing in the flow direction of the reactant gases. The fuel cell stack 2 according to the present embodiment is configured so that the direction of air flow in the cathode gas flow path 42 is opposite the direction of hydrogen flow in the anode gas flow path 44, namely, the air and the hydrogen flow in opposing directions. In FIGS. 3 and 4, the inlet of the cathode gas flow path 42 and the outlet of the anode gas flow path 44 are positioned at the left end of the horizontal axis, whereas the outlet of the cathode gas flow path 42 and the inlet of the anode gas flow path 44 are positioned at the right end of the horizontal axis.

The electrical current distribution indicated by the solid lines in FIGS. 3 and 4 is a normal electrical current distribution that prevails when the dry state or wet state of the interior of the fuel cell is normal. When electrical current distribution changes are examined with reference to the normal electrical current distribution, it is possible to diagnostically check for abnormalities in the fuel cell stack 2, namely, dry-up and flooding.

First of all, a dry-up diagnostic check method based on electrical current distribution changes will be described. The electrical current distribution indicated by the broken line in FIG. 3 prevails when dry-up has occurred on the cathode side of the power generation plane (this phenomenon will be hereinafter referred to as CA dry-up). On the cathode side of the power generation plane, the possibility of the occurrence of dryness increases with a decrease in the distance to the inlet of the cathode gas flow path 42. In a portion where the power generation plane is significantly dry, the ionic conductivity of electrolytic film decreases, thereby decreasing the electrical current density. In a catalytic layer, however, a power generation reaction has occurred so that an electrical current generated by the power generation reaction converges on a portion that is not dry. Consequently, as indicated by the broken line in FIG. 3, the peak position of electrical current density is displaced toward the outlet of the cathode gas flow path 42, which is not significantly dry. Therefore, when the peak position of electrical current density is displaced toward the outlet of the cathode gas flow path 42, it can be concluded that CA dry-up has occurred. Further, when the amount of change in the peak position of electrical current density is increased, it can be concluded that dry-up has occurred in an enlarged portion of the cathode.

The electrical current distribution indicated by the broken line in FIG. 4 prevails when dry-up has occurred on the anode side of the power generation plane (this phenomenon will be hereinafter referred to as AN dry-up). For the same reason as for the cathode side, when the peak position of electrical current density is displaced toward the outlet of the anode gas flow path 44, it can be concluded that AN dry-up has occurred. Further, when the amount of change in the peak position of electrical current density is increased, it can be concluded that dry-up has occurred in an enlarged portion of the anode.

Next, a flooding diagnostic check method based on electrical current distribution changes will be described. The electrical current distribution indicated by the dotted line in FIG. 3 prevails when flooding has occurred on the cathode side of the power generation plane (this phenomenon will be hereinafter referred to as CA flooding). On the cathode side of the power generation plane, the possibility of the occurrence of excessive wetness increases with a decrease in the distance to the outlet of the cathode gas flow path 42. In a portion where the power generation plane is excessively wet, gas diffusion into the catalytic layer of the cathode is obstructed. Therefore, the power generation reaction in such a portion is reduced to considerably decrease the electrical current density as indicated by the dotted line in FIG. 3.

However, the interior of each fuel cell unit 30 according to the present embodiment is configured so that air and hydrogen flow in opposing directions. Therefore, as indicated by the broken line in FIG. 4, the electrical current density prevailing near the outlet of the cathode gas flow path 42 decreases in the event of AN dry-up as well. Thus, it is difficult to distinguish between CA flooding and AN dry-up no matter when there is a change in the electrical current density prevailing near the outlet of the cathode gas flow path 42. However, in the event of AN dry-up, the electrical current density of a normal portion increases with a decrease in the electrical current density of a dry portion. In the event of CA flooding, on the other hand, only the electrical current density of an excessively wet portion decreases. Consequently, when the electrical current density prevailing near the outlet of the cathode gas flow path 42 decreases without changing the peak position of electrical current density, it can be concluded that CA flooding has occurred. Further, when a portion where the electrical current density is decreased is enlarged, it can be concluded that flooding has occurred in an enlarged portion of the cathode.

The electrical current distribution indicated by the dotted line in FIG. 4 prevails when flooding has occurred on the anode side of the power generation plane (this phenomenon will be hereinafter referred to as AN flooding). For the same reason as for the anode side, when the electrical current density prevailing near the outlet of the anode gas flow path 44 decreases without changing the peak position of electrical current density, it can be concluded that AN flooding has occurred. Further, when a portion where the electrical current density is decreased is enlarged, it can be concluded that flooding has occurred in an enlarged portion of the anode.

As described above, it is possible to run a detailed diagnostic check on the internal dryness or wetness of the fuel cell by diagnostically checking for abnormalities in accordance with electrical current distribution changes. Particularly when attention is focused on changes in the peak position of electrical current distribution, it is possible to run a detailed diagnostic check on the occurrence of dry-up.

Next, a method of controlling the operating conditions in accordance with the result of the diagnostic check will be described. First of all, if the diagnostic check result indicates that CA dry-up has occurred, the operating conditions for the fuel cell stack are controlled by performing procedure (a1), (a2), or (a3) below to recover from a CA dry-up state to a normal state (this control will be hereinafter referred to as CA dry-up recovery control). Only one or a combination of a plurality of operating conditions may be controlled. CA dry-up recovery control is continuously exercised until the electrical current distribution returns to a normal range.

(a1) Decreasing a cathode stoichiometric ratio by lowering the rotation speed of the air compressor 20

(a2) Increasing a cathode back pressure by decreasing the opening of the back pressure regulating valve 26

(a3) Increasing the degree of air humidification by the humidifier 28

If the diagnostic check result indicates that AN dry-up has occurred, the operating conditions for the fuel cell stack are controlled by performing procedure (b1), (b2), or (b3) below to recover from an AN dry-up state to a normal state (this control will be hereinafter referred to as AN dry-up recovery control). Only one or a combination of the plurality of operating conditions may be controlled. AN dry-up recovery control is continuously exercised until the electrical current distribution returns to a normal range.

(b1) Decreasing the cathode stoichiometric ratio by lowering the rotation speed of the air compressor 20

(b2) Increasing the cathode back pressure by decreasing the opening of the back pressure regulating valve 26

(b3) Increasing the degree of air humidification by the humidifier 28

If the diagnostic check result indicates that CA flooding has occurred, the operating conditions for the fuel cell stack are controlled by performing procedure (c1), (c2), or (c3) below to recover from a CA flooding state to a normal state (this control will be hereinafter referred to as CA flooding recovery control). Only one or a combination of the plurality of operating conditions may be controlled. CA flooding recovery control is continuously exercised until the electrical current distribution returns to a normal range.

(c1) Increasing the cathode stoichiometric ratio by raising the rotation speed of the air compressor 20

(c2) Decreasing the cathode back pressure by increasing the opening of the back pressure regulating valve 26

(c3) Raising the outlet temperature of a refrigerant in the fuel cell when the refrigerant flows in the same direction as the air If the diagnostic check result indicates that AN flooding has occurred, the operating conditions for the fuel cell stack are controlled by performing procedure (d1), (d2), (d3), or (d4) below to recover from an AN flooding state to a normal state (this control will be hereinafter referred to as AN flooding recovery control). Only one or a combination of the plurality of operating conditions may be controlled. AN flooding recovery control is continuously exercised until the electrical current distribution returns to a normal range.

(d1) Increasing an anode stoichiometric ratio by raising the rotation speed of the circulation pump 14 or increasing the opening of the variable pressure regulator 8

(d2) Decreasing an anode back pressure by raising the rotation speed of the circulation pump 14

(d3) Increasing the cathode stoichiometric ratio by raising the rotation speed of the air compressor 20

(d4) Decreasing the degree of air humidification by the humidifier 28

Figure 5:
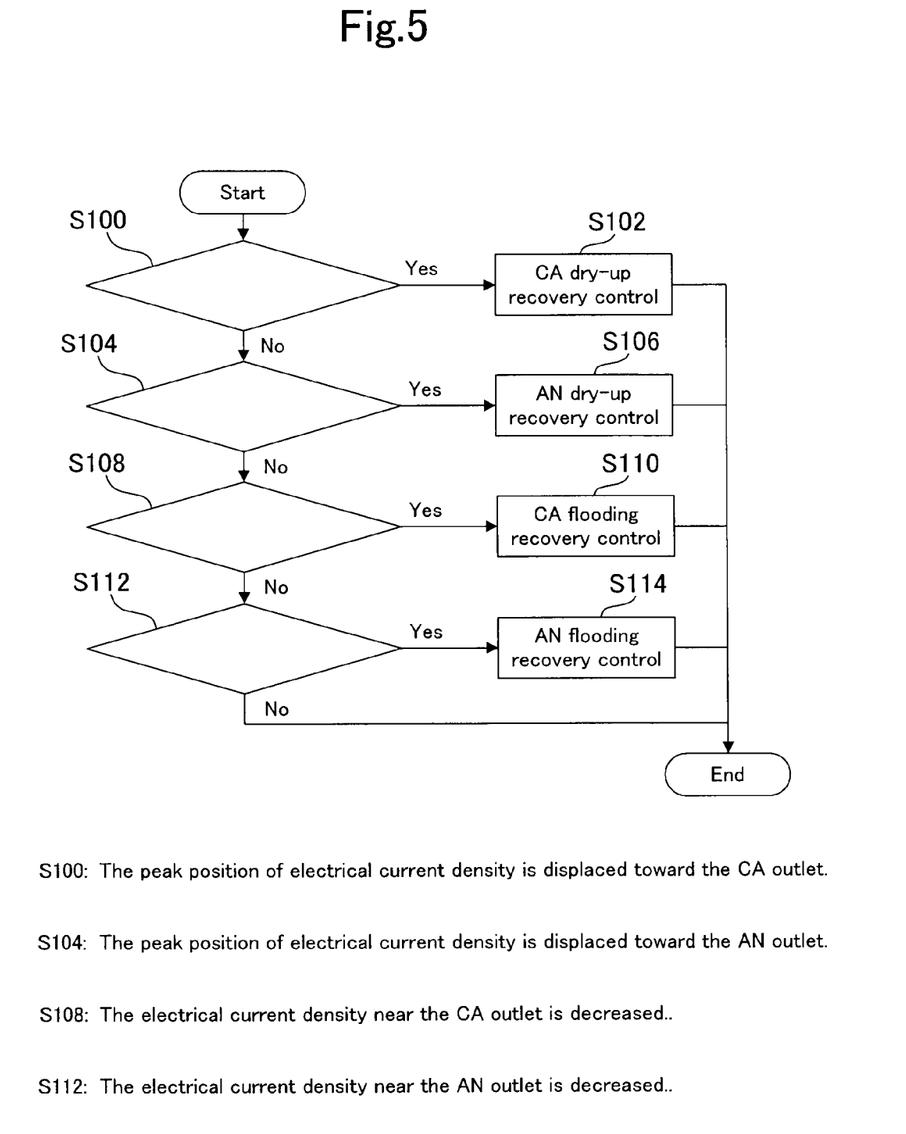
FIG. 5 is a flowchart showing a routine, which is executed in the first embodiment of the present invention, to diagnostically check for abnormalities in accordance with a measurement signal of a current measurement cell and exercise recovery control in accordance with the result of the diagnostic check.

The controller 10 executes a routine shown in the flowchart of FIG. 5 to diagnostically check for abnormalities in accordance with a measurement signal of the current measurement cell 32 and exercise recovery control in accordance with the result of the diagnostic check. First of all, the routine performs step S100 to judge whether the peak position of electrical current density is displaced toward the outlet of the cathode. If the judgment result obtained in step S100 is YES, the routine concludes that CA dry-up has occurred, and performs step S102 to exercise CA dry-up recovery control.

If, on the other hand, the judgment result obtained in step S100 is NO, the routine proceeds to step S104 and judges whether the peak position of electrical current density is displaced toward the outlet of the anode. If the judgment result obtained in step S104 is YES, the routine concludes that AN dry-up has occurred, and performs step S106 to exercise AN dry-up recovery control.

If, on the other hand, the judgment result obtained in step S104 is NO, the routine proceeds to step S108 and judges whether the electrical current density prevailing near the cathode outlet is decreased. If the judgment result obtained in step S108 is YES, the routine concludes that CA flooding has occurred, and performs step S110 to exercise CA flooding recovery control.

If, on the other hand, the judgment result obtained in step S108 is NO, the routine proceeds to step S112 and judges whether the electrical current density prevailing near the anode outlet is decreased. If the judgment result obtained in step S112 is YES, the routine concludes that AN flooding has occurred, and performs step S114 to exercise AN flooding recovery control. If, on the other hand, the judgment result obtained in step S112 is NO, the routine concludes that neither dry-up nor flooding has occurred on the power generation plane of the fuel cell stack 2, namely, the fuel cell stack 2 is in a normal state.

In the present embodiment, the "diagnostic check means" according to the first and second aspects of the present invention and the "control means" according to the fourth aspect are implemented when the controller 10 executes the routine shown in FIG. 5.

The following description deals with the process to be performed when the fuel cell system according to the present embodiment shuts down. When the fuel cell system starts up, water generated by the power generation reaction remains in the fuel cell stack 2. The remaining water is essential to ionic conduction of electrolytic film. However, if water content distribution in the power generation plane is biased, a problem occurs when the fuel cell system starts up at a temperature below zero. When the fuel cell system starts up at a temperature below zero, heat generated by internal resistance is used to conduct a warm-up operation for the purpose of warming up the interior of the fuel cell. However, if the water content distribution is biased, the warm-up operation takes longer than expected because a portion having the highest water content becomes rate-limiting.

Figure 6:
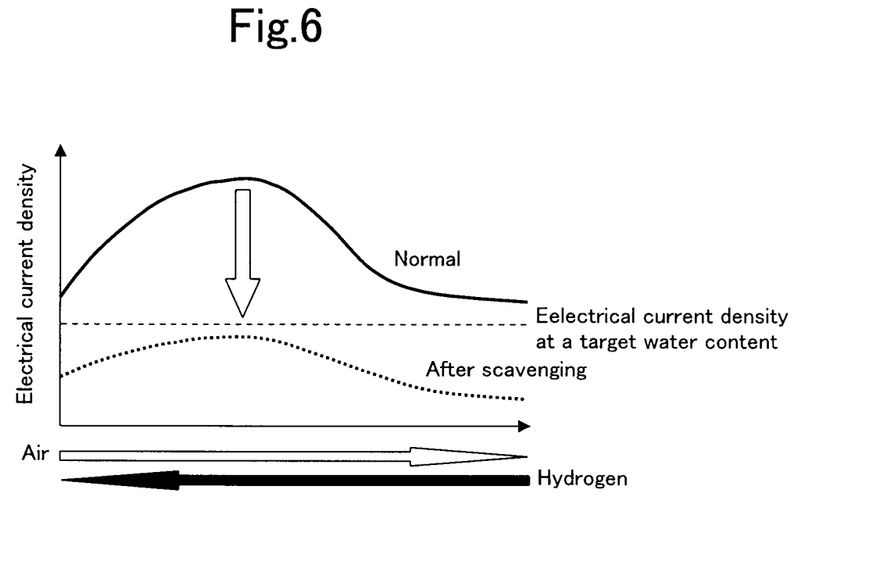
FIG. 6 is an illustration to explain a shut-down control method executed in the first embodiment of the present invention.

In view of the above circumstances, the present embodiment performs a scavenging process when shutting down the fuel cell system so that the water content distribution in the power generation plane is substantially uniform. The scavenging process is performed by slightly sweeping a current at a constant voltage. The present embodiment scavenges both the cathode side and anode side. When power is generated while performing the scavenging process, the distribution of electrical current density is determined by the water content distribution in the power generation plane because power generation takes place in a stoichiometrically excess state. Therefore, the water content distribution can be monitored indirectly by monitoring the distribution of electrical current density. As shown in FIG. 6, the present embodiment performs the scavenging process until the overall electrical current density decreases below a reference value that represents the electrical current density prevailing when a target water content is reached. When the overall electrical current density is below the reference value, the present embodiment stops both the scavenging process and current sweep process.

The following description deals with the process to be performed when the fuel cell system according to the present embodiment starts up. As the above-described scavenging process is performed when the fuel cell system shuts down, the water content distribution prevailing in the power generation plane at fuel cell system startup remains substantially low. It is desirable that the traction of the load be started immediately after startup. To achieve such a purpose, it is necessary to increase the water content in the power generation plane. However, a local increase in the water content may incur flooding in the affected portion or freeze generated water at a temperature below zero.

Figure 7:
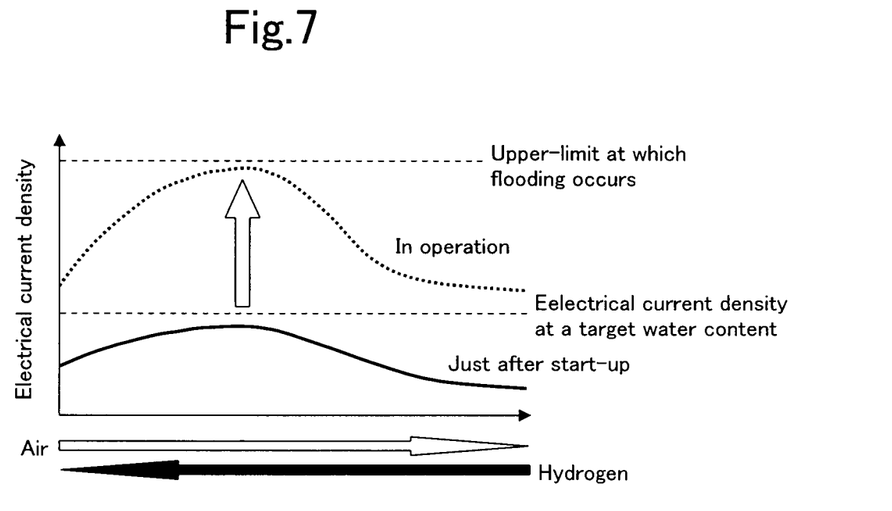
FIG. 7 is an illustration to explain a start-up control method executed in the first embodiment of the present invention.

In view of the above circumstances, the present embodiment defines an upper-limit electrical current density at which flooding occurs (or an upper-limit electrical current density at which the generated water freezes), as shown in FIG. 7, and controls the load 18 so that the upper-limit electrical current density is not exceeded. As the amount of generated electrical power is substantially proportional to the amount of generated water, the water content distribution can be monitored indirectly by monitoring the distribution of electrical current density. Since the amount of generated electrical power depends on voltage and current values, the aforementioned upper-limit electrical current density is defined for each voltage value. Further, as the water content in the power generation plane varies with a gas flow rate, particularly the gas flow rate on the cathode side, the aforementioned upper-limit electrical current density is changed in accordance with the gas flow rate as well.

Second Embodiment

A second embodiment of the present invention will now be described with reference to the accompanying drawings.

The fuel cell system according to the second embodiment differs from the fuel cell system according to the first embodiment in the direction of reactant gas flow within the fuel cell stack 2. The fuel cell stack 2 according to the second embodiment is configured so that the direction of air flow in the cathode gas flow path 42 is the same as the direction of hydrogen flow in the anode gas flow path 44, namely, the air and the hydrogen flow in parallel with each other. As the second embodiment differs from the first embodiment in the direction of reactant gas flow, the fuel cell system according to the second embodiment also differs from the fuel cell system according to the first embodiment in the abnormality diagnostic check method based on a measurement signal of the current measurement cell 32.

Figure 8:
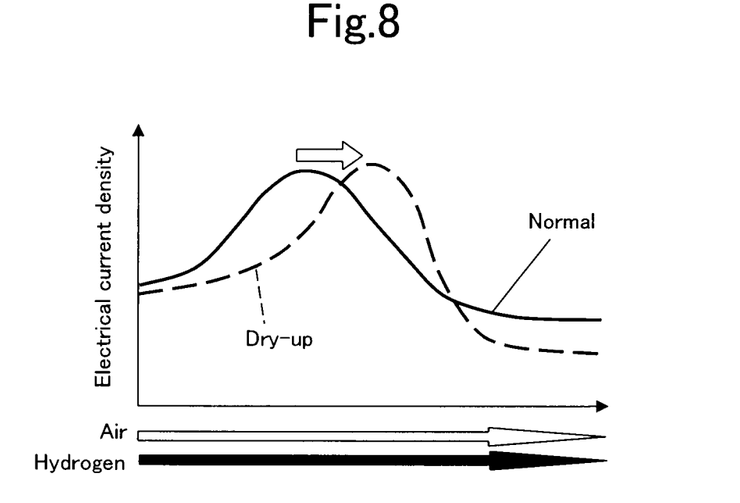
FIG. 8 is a comparison chart showing the electrical current density distribution prevailing when dry-up has occurred and the normal electrical current density distribution in the fuel cell configured to let the reactant gases flow in parallel directions.
Figure 9:
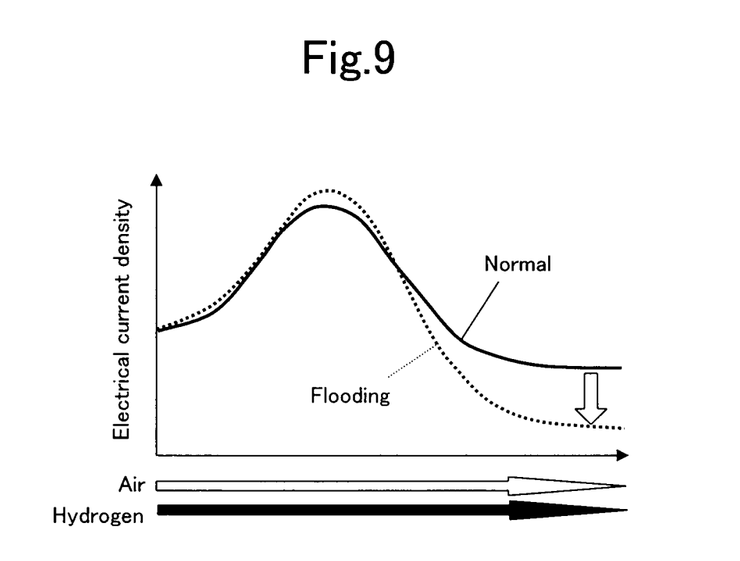
FIG. 9 is a comparison chart showing the electrical current density distribution prevailing when flooding has occurred and the normal electrical current density distribution in the fuel cell configured to let the reactant gases flow in parallel directions.

FIGS. 8 and 9 show the signals of the current sensors 34 contained in the current measurement cell 32, which are arranged in the direction of reactant gas flow. These figures indicate the distribution of electrical current density prevailing in the direction of reactant gas flow. In FIGS. 8 and 9, the inlet of the cathode gas flow path 42 and the inlet of the anode gas flow path 44 are positioned at the left end of the horizontal axis, whereas the outlet of the cathode gas flow path 42 and the outlet of the anode gas flow path 44 are positioned at the right end of the horizontal axis.

The electrical current distribution indicated by the solid lines in FIGS. 8 and 9 is a normal electrical current distribution that prevails when the dry state or wet state of the interior of the fuel cell is normal. When electrical current distribution changes are examined with reference to the normal electrical current distribution, it is possible to diagnostically check for abnormalities in the fuel cell stack 2, namely, dry-up and flooding.

First of all, a dry-up diagnostic check method based on electrical current distribution changes will be described. The electrical current distribution indicated by the broken line in FIG. 8 prevails when dry-up has occurred on the cathode or anode side of the power generation plane. As described in connection with the first embodiment, when the peak position of electrical current density is displaced toward the outlet of the cathode or anode gas flow path 42, 44, it can be concluded that dry-up has occurred. Further, when the amount of change in the peak position of electrical current density is increased, it can be concluded that dry-up has occurred in an enlarged portion of the power generation plane.

However, no matter whether the peak position of electrical current density is displaced toward the outlet, it is practically impossible to determine whether dry-up has occurred on the anode side or cathode side. To determine whether dry-up has occurred on the anode side or cathode side, it is necessary to change the anode stoichiometric ratio by controlling the rotation speed of the circulation pump 14. Changing the anode stoichiometric ratio causes the amount of water removal from the anode side to change accordingly. Therefore, if dry-up has occurred on the anode side, decreasing the anode stoichiometric ratio shifts the peak position of electrical current density toward the inlet, and increasing the anode stoichiometric ratio further shifts the peak position of electrical current density toward the outlet. Meanwhile, the water content on the cathode side remains virtually unaffected by the gas flow rate on the anode side. Therefore, if dry-up has occurred on the cathode side, changing the anode stoichiometric ratio does not cause a change in the peak position of electrical current density.

If the cathode stoichiometric ratio is changed instead of the anode stoichiometric ratio, the amount of water removal from the cathode side changes accordingly. However, the cathode side gas flow rate is extremely higher than the anode side gas flow rate. Therefore, the movement of water through the electrolytic film changes the water content on the anode side as well. More specifically, if the cathode stoichiometric ratio is changed, it is practically impossible to determine whether dry-up has occurred on the anode side or cathode side of the power generation plane.

Next, a flooding diagnostic check method based on electrical current distribution changes will be described. The electrical current distribution indicated by the dotted line in FIG. 9 prevails when flooding has occurred on the anode or cathode side of the power generation plane. As described in connection with the first embodiment, when the electrical current density prevailing near the outlet of the cathode or anode gas flow path 42, 44 decreases without changing the peak position of electrical current density, it can be concluded that flooding has occurred. Further, when a portion where the electrical current density is decreased is enlarged, it can be concluded that flooding has occurred in an enlarged portion of the power generation plane.

However, no matter whether the electrical current density prevailing near the outlet of the cathode or anode gas flow path 42, 44 is decreased, it is practically impossible to determine whether flooding has occurred on the anode side or cathode side. To determine whether flooding has occurred on the anode side or cathode side, it is necessary to change the anode stoichiometric ratio by controlling the rotation speed of the circulation pump 14, as is the case with dry-up location determination. If flooding has occurred on the anode side, decreasing the anode stoichiometric ratio further decreases the electrical current density prevailing near the outlet and increasing the anode stoichiometric ratio recovers the electrical current density prevailing near the outlet. If, on the other hand, flooding has occurred on the cathode side, changing the anode stoichiometric ratio does not cause a change in the peak position of electrical current density for the same reason as for dry-up.

Figure 10:
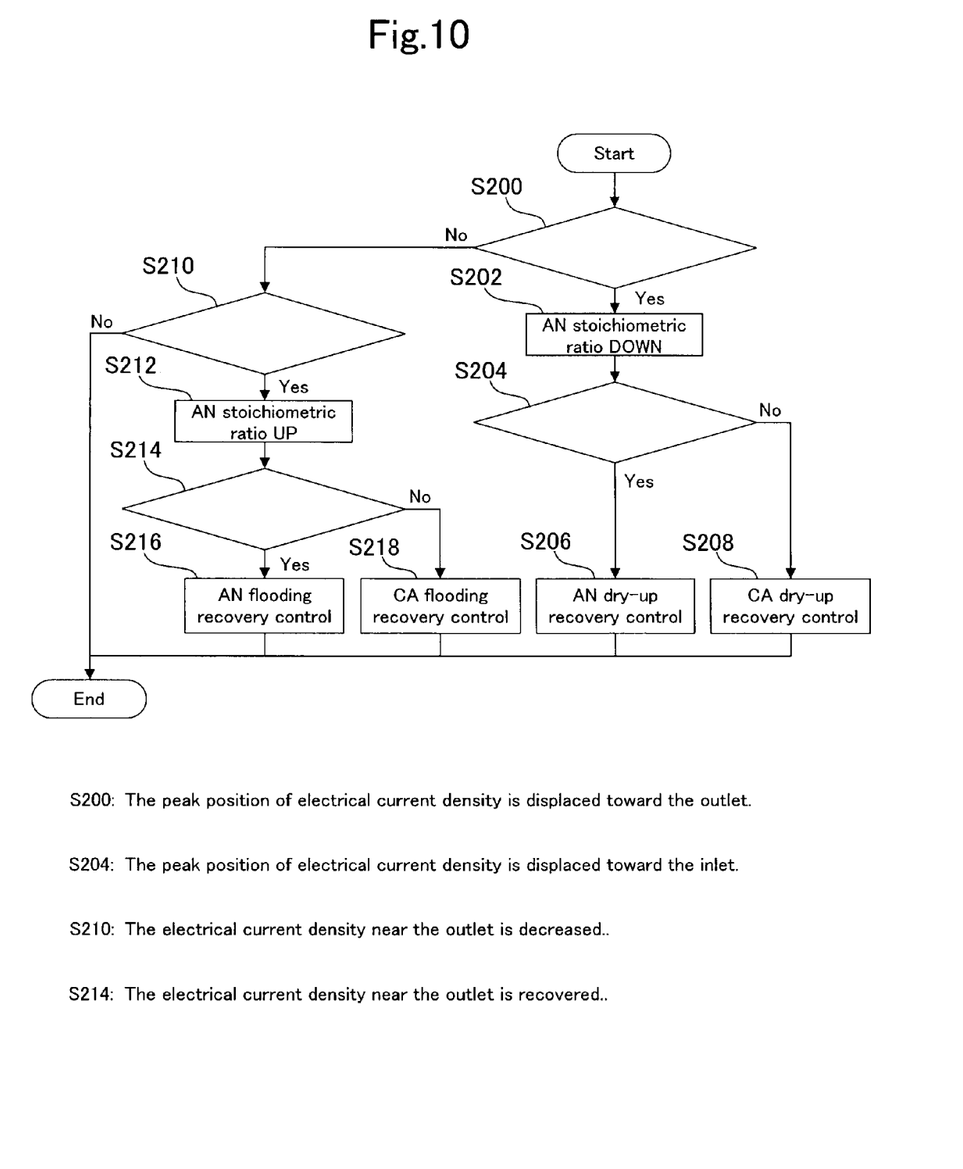
FIG. 10 is a flowchart showing a routine, which is executed in a second embodiment of the present invention, to diagnostically check for abnormalities in accordance with a measurement signal of a current measurement cell and exercise recovery control in accordance with the result of the diagnostic check.

In the fuel cell system according to the present embodiment, the controller 10 executes a routine shown in the flowchart of FIG. 10 to diagnostically check for abnormalities in accordance with a measurement signal of the current measurement cell 32 and exercise recovery control in accordance with the result of the diagnostic check. First of all, the routine performs step S200 to judge whether the peak position of electrical current density is displaced toward the outlet. If the judgment result obtained in step S200 is YES, the routine proceeds to step S202 and performs a process for decreasing the anode stoichiometric ratio.

Next, the routine performs step S204 to judge whether the peak position of electrical current density is displaced toward the inlet due to a decrease in the anode stoichiometric ratio. If the judgment result obtained in step S204 is YES, the routine concludes that AN dry-up has occurred, and performs step S206 to exercise AN dry-up recovery control. If, on the other hand, the judgment result obtained in step S204 is NO, the routine concludes that CA dry-up has occurred, and performs step S208 to exercise CA dry-up recovery control. Details of recovery control operations are as described in connection with the first embodiment.

If, on the other hand, the judgment result obtained in step S200 is NO, the routine proceeds to step S210 and judges whether the electrical current density prevailing near the outlet is decreased. If the judgment result obtained in step S210 is YES, the routine proceeds to step S212 and performs a process for increasing the anode stoichiometric ratio.

Next, the routine performs step S214 to judge whether the electrical current density prevailing near the outlet is recovered due to an increase in the anode stoichiometric ratio. If the judgment result obtained in step S214 is YES, the routine concludes that AN flooding has occurred, and performs step S216 to exercise AN flooding recovery control. If, on the other hand, the judgment result obtained in step S214 is NO, the routine concludes that CA flooding has occurred, and performs step S218 to exercise CA flooding recovery control. If the judgment result obtained in step S210 is NO, the routine concludes that neither dry-up nor flooding has occurred on the power generation plane of the fuel cell stack 2, namely, the fuel cell stack 2 is in a normal state.

In the present embodiment, the "diagnostic check means" according to the first and third aspects of the present invention and the "control means" according to the fourth aspect are implemented when the controller 10 executes the routine shown in FIG. 10.

Other

While the present invention has been described in terms of preferred embodiments, it is not limited to the above-described embodiments, but extends to various modifications that nevertheless fall within the scope of the appended claims. For example, the following modifications can be made to the preferred embodiments of the present invention.

Figure 11:
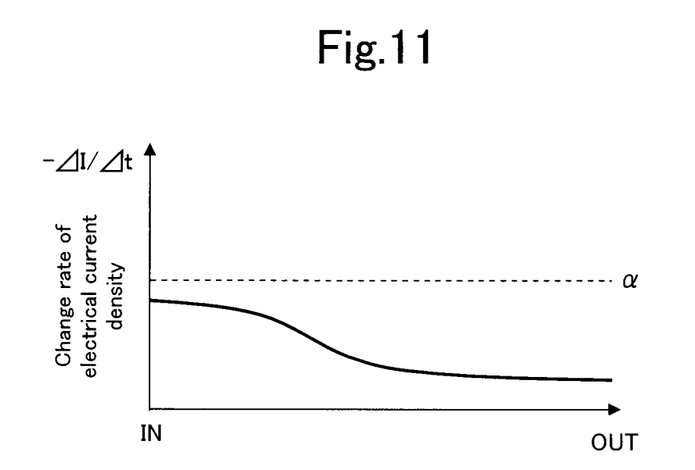
FIG. 11 shows the distribution of the rate of change in the electrical current density that prevails when dry-up has occurred.
Figure 12:
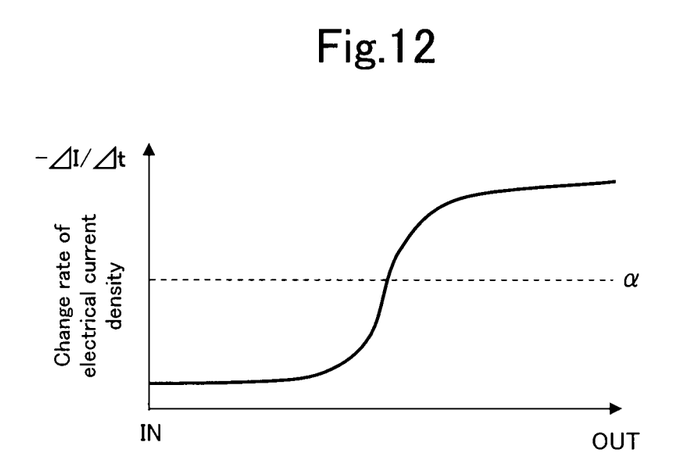
FIG. 12 shows the distribution of the rate of change in the electrical current density that prevails when flooding has occurred.

When the peak position of electrical current density is displaced toward the outlet, the embodiments described above conclude that dry-up has occurred. However, if the amount of such displacement is small, it is difficult to distinguish between dry-up and flooding. In such an instance, the distribution of the rate of temporal change in the electrical current density may be alternatively measured in addition to the distribution of electrical current density to distinguish between dry-up and flooding in accordance with the rate of change in the electrical current density. FIG. 11 shows the distribution of the rate of change in the electrical current density that prevails when dry-up has occurred, whereas FIG. 12 shows the distribution of the rate of change in the electrical current density that prevails when flooding has occurred. As is obvious from these figures, the rate of decrease in the electrical current density is low in the event of dry-up in which the power generation plane gradually dries. In the event of flooding in which water covers the surface of the catalytic layer, on the other hand, the rate of decrease in the electrical current density is high. Therefore, when a threshold value α is defined for the rate of change in the electrical current density, it is possible to distinguish between flooding and dry-up by determining whether the threshold value α is exceeded by the distribution of the rate of decrease in the electrical current density.

The embodiments described above use a method of generating electrical power while circulating an anode gas. Alternatively, however, a method of generating electrical power with the anode gas confined within the fuel cell stack may be used. When such an alternative method is used, the devices (circulation pump and ejector) for circulating the anode gas are not required. Meanwhile, as nitrogen and other impurities accumulate in the anode gas flow path, an exhaust valve is installed to purge such impurities to the outside. When the fuel cell stack generates electrical power, the exhaust valve is either completely closed or slightly open to continuously discharge a small amount of impurities. When a small amount of impurities is continuously discharged, the opening of the exhaust valve is adjusted so that the flow rate of the anode gas discharged out of the system is extremely lower than the rate of hydrogen consumption in the fuel cell stack.

Even when the above alternative method is employed, CA dry-up recovery control, CA flooding recovery control, and AN dry-up recovery control, which are provided in accordance with the diagnostic check result, can be exercised in the same manner as described in conjunction with the above-described embodiments. AN flooding recovery control, which is also provided in accordance with the diagnostic check result, can be exercised by performing procedure (d3) or (d4) or by decreasing the anode back pressure with the exhaust valve open.

The present invention is also applicable to a fuel cell system without the exhaust valve or a fuel cell system that operates the exhaust valve in emergency only. In a situation where the exhaust valve does not perform the aforementioned purge, the partial pressure of impurities in the anode gas flow path increases with operating time. However, when the partial pressure of impurities in the anode gas flow path increases to a certain level, it equals the partial pressure of impurities in the cathode gas flow path and does not increase any further. In such a fuel cell system, AN flooding recovery control can be exercised by performing procedure (d3) or (d4).

DESCRIPTION OF REFERENCE NUMERALS

2 Fuel cell stack
4 Cylinder pressure sensor
6 Hydrogen supply path
8 Variable pressure regulator
10 Controller
12 Anode gas circulation path
14 Circulation pump
18 Load
20 Air compressor
22 Air supply path
24 Cathode gas exhaust path
26 Back pressure regulating valve
28 Humidifier
30 Fuel cell unit
32 Current measurement cell
34 Current sensor
40 Membrane-electrode assembly
42 Cathode gas flow path
44 Anode gas flow path
46, 48 Power collector plate

The invention claimed is:

1. A fuel cell system comprising:
   a fuel cell which generates electrical power after allowing an anode and a cathode to respectively receive a reactant gas;
   a plurality of sensors configured to measure a distribution of electrical current density on a power generation plane of the fuel cell by measuring currents at a plurality of places along the power generation plane;
   a diagnostic check controller configured to locate a peak position that exhibits the highest value within the distribution of electrical current density on the power generation plane, detect a change in the peak position of electrical current density on the power generation plane, and diagnose an internal dryness of the fuel cell in accordance with the change in the peak position of electrical current density on the power generation plane; and
   a controller configured to control operating conditions of the fuel cell based on a diagnostic result by the diagnostic check controller.

2. The fuel cell system according to claim 1, wherein the fuel cell is configured to let the reactant gas on the anode side and the reactant gas on the cathode side flow in opposing directions with the power generation plane positioned in between; and
   wherein the diagnostic check controller judges whether the peak position of electrical current density is displaced toward an outlet of the anode or an outlet of the cathode, and locates a dry portion in accordance with the result of judgment.

3. The fuel cell system according claim 2, further comprising:
   a fuel cell controller configured to control, when the diagnostic check controller judges that an interior of the fuel cell is dry, operating conditions for the fuel cell in accordance with the result of judgment to ensure that the peak position of electrical current density returns to a peak position prevailing before a change.

4. The fuel cell system according to claim 1, wherein the fuel call is configured to let the reactant gas on the anode side and the reactant gas on the cathode side flow in parallel directions with the power generation plane positioned in between; and
   wherein, when the peak position of electrical current density is changed, the diagnostic check controller verifies whether the peak position of electrical current density varies with anode side reactant gas supply conditions, and locates a dry portion in accordance with the result of verification.

5. The fuel cell system according claim 4, further comprising:
   a fuel cell controller configured to control, when the diagnostic check controller judges that an interior of the fuel cell is dry, operating conditions for the fuel cell in accordance with the result of judgment to ensure that the peak position of electrical current density returns to a peak position prevailing before a change.

6. The fuel cell system according to claim 1, further comprising:
   a fuel cell controller configured to control, when the diagnostic check controller judges that an interior of the fuel cell is dry, operating conditions for the fuel cell in accordance with the result of judgment to ensure that the peak position of electrical current density returns to a peak position prevailing before a change.

* * * * *